United States Patent [19]

Hosoi

[11] Patent Number: 5,088,156
[45] Date of Patent: Feb. 18, 1992

[54] SHAFT LOCK DEVICE AND PORTABLE INFORMATION PROCESSING APPARATUS WITH SHAFT LOCK DEVICE

[75] Inventor: Takashi Hosoi, Oome, Japan
[73] Assignee: Kabushiki Kaisha Toshiba, Kawasaki, Japan
[21] Appl. No.: 472,573
[22] Filed: Jan. 30, 1990

[30] Foreign Application Priority Data

Jan. 31, 1989 [JP] Japan .................. 1-10047[U]

[51] Int. Cl.⁵ .................. E05C 17/64; E05D 11/08
[52] U.S. Cl. .................. 16/342; 16/337
[58] Field of Search .................. 16/337, 342, 338

[56] References Cited

U.S. PATENT DOCUMENTS 3,064,766 11/1962 Hanizeski .
4,781,422 11/1988 Kimble .
4,864,523 9/1989 Sasaki .

FOREIGN PATENT DOCUMENTS 0331490 9/1989 European Pat. Off. .
8800180 2/1988 Fed. Rep. of Germany .
1397277 2/1964 France .
59-99111 6/1984 Japan .
277226 11/1949 Switzerland .
497223 12/1938 United Kingdom .

Primary Examiner—Robert L. Spruill
Assistant Examiner—Carmine Cuda
Attorney, Agent, or Firm—Cushman, Darby & Cushman

[57] ABSTRACT

A shaft lock device includes a cylindrical rotational shaft, and first and second members. The first member supports one end of the rotational shaft so that the shaft is rotatable around the axis thereof, and the second member is fixed to the other end portion of the shaft and rotatable integrally with the shaft. A coil spring, coiled in a predetermined direction and having a coil diameter greater than the inner diameter of the shaft, is arranged in the shaft along the axial direction while the outer surface of the spring is pressed against the inner circumferential surface of the shaft when the second member is rotated in the direction opposite the coiling direction, the spring is urged to expand in its radial direction, thereby retaining the shaft from rotating. When the second member is rotated in the coiling direction, the spring is urged to contract in its radial direction, thereby allowing the shaft to rotate.

26 Claims, 4 Drawing Sheets

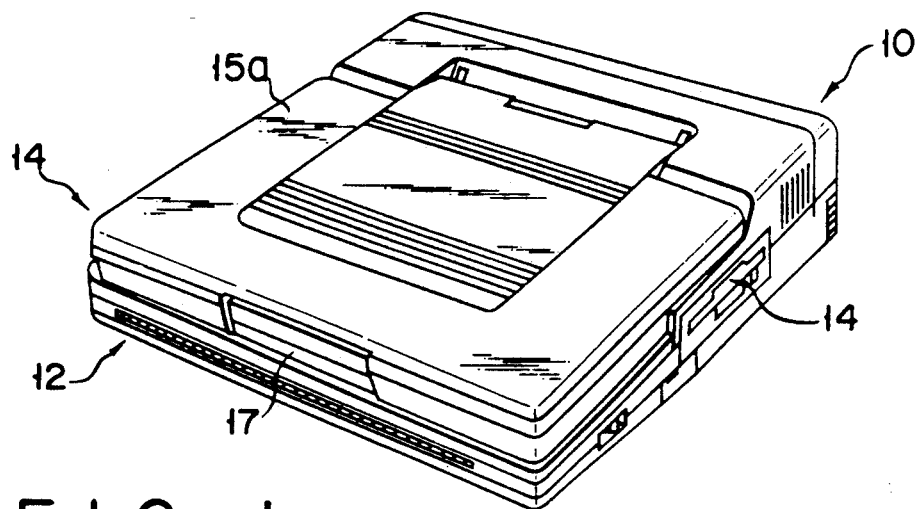
F I G. 1
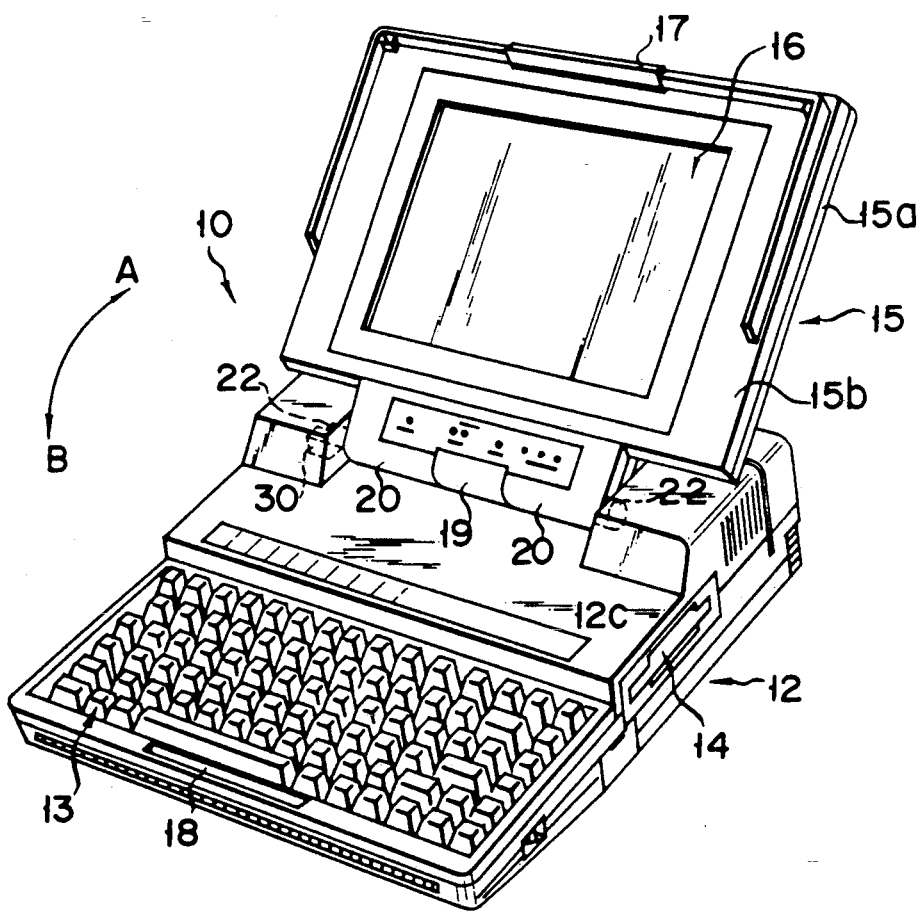
F I G. 2

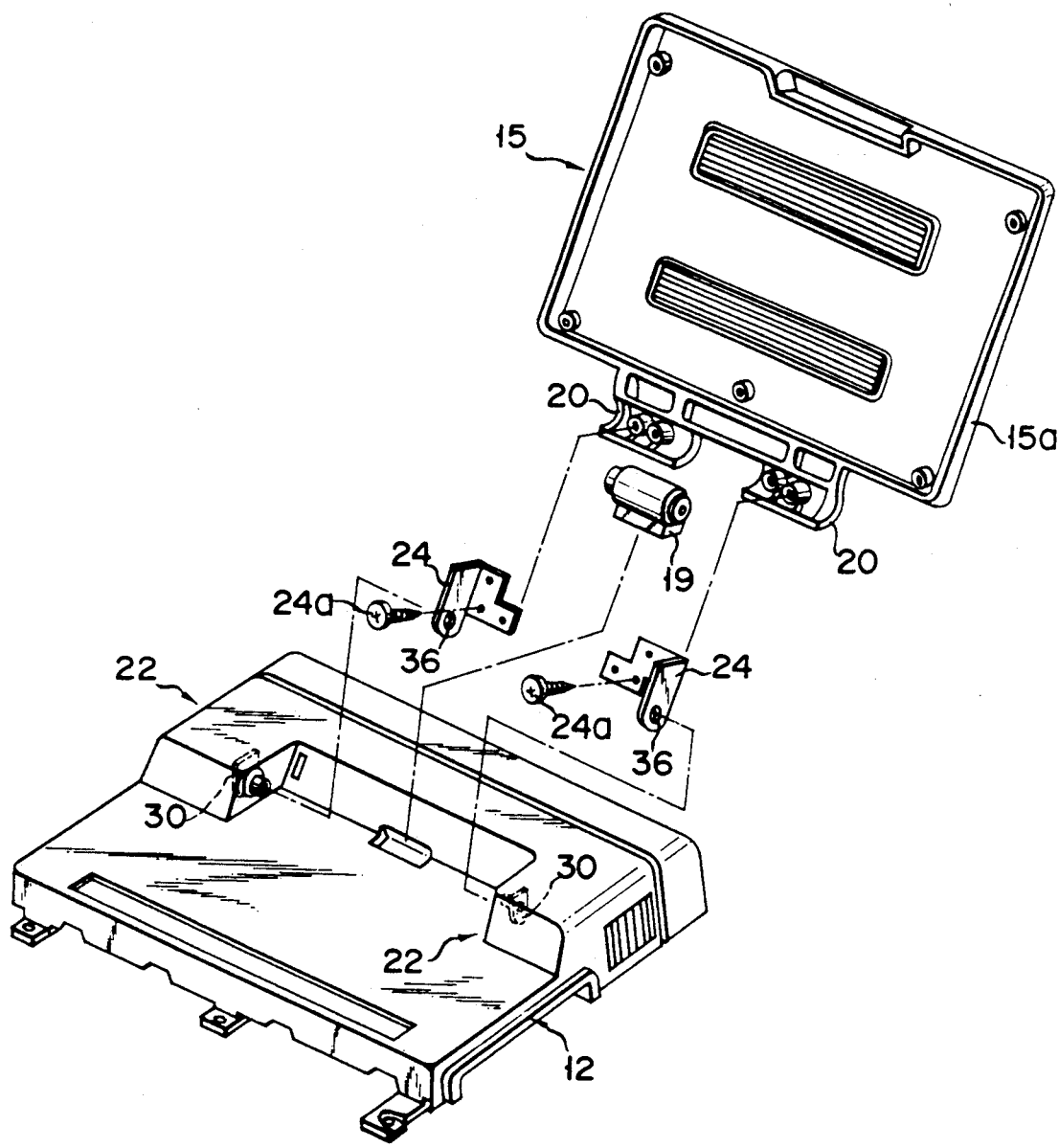
F I G. 3

SHAFT LOCK DEVICE AND PORTABLE INFORMATION PROCESSING APPARATUS WITH SHAFT LOCK DEVICE

BACKGROUND OF THE INVENTION

1. Field of the Invention

The present invention relates to a shaft lock device for a hinge mechanism with a rotational shaft, and to a portable information processing apparatus provided with the shaft lock device.

2. Description of the Related Art

Presently, in the field of personal computers or word processors, desktop apparatuses are being replaced by laptop apparatuses that are small, light, and portable.

As disclosed in U.S. Pat. No. 4,864,523, laptop type information processing apparatuses generally comprise a main body, which contains a keyboard, a disk drive, etc., and a display unit pivotably supported on the main body by means of a hinge mechanism.

The hinge mechanism has a shaft lock device for locking the display unit at a desired angular position. The lock device comprises a metal rotational shaft supported so as to rotate in response to the pivoting motion of the display unit, and a coil spring rigidly wound around the rotational shaft and having one end fixed to the main body of the apparatus. One end of the shaft is engaged with a first bracket of the display unit so that the shaft rotates along with the display unit. The other end of the shaft is rotatably supported by a second bracket attached to the main body. One end of the coil spring is fixed to the second bracket. The operation of the lock device with the above-mentioned structure is disclosed, e.g., in U.S. Pat. No. 3,064,766.

With the conventional shaft lock device, the coil spring with a predetermined length is wound around the rotational shaft, and the shaft is fixed at its one end to the first bracket of the display unit and is rotatably supported at its other end by the second bracket of the main body. Therefore, the entire length of the lock device is always larger than that of the coil spring. Further, for the mechanical strength of the device, the rotational shaft should be made of a metal, thus increasing the weight of the device.

SUMMARY OF THE INVENTION

The present invention has been contrived in consideration of these circumstances, and its object is to provide a compact and light shaft lock device, and a portable information processing apparatus provided therewith.

In order to achieve the above object, a device according to the present invention is constructed utilizing the slipping performance of a coil spring. If a coil spring is subjected to stress in its coiling direction, its coil diameter is reduced. If it is subjected to stress in the direction opposite the coiling direction, on the other hand, the coil diameter increases. According to the device of the invention, the coil spring is located in a rotatable hollow member, whose rotation is dampened by applying the coil spring with stress in the coiling direction or in the opposite direction to control the frictional force between the spring and the member.

More specifically, the shaft lock device of the present invention comprises: a cylindrical rotational shaft having outer and inner circumferential surfaces coaxial with each other; a first member supporting one end portion of the rotational shaft so that the shaft is rotatable around the axis thereof; a second member fixed to the other end portion of the rotational shaft and pivotable integrally with the rotational shaft; and a coil spring coiled in a predetermined direction and having a coil diameter greater than the inner diameter of the rotational shaft, the coil spring being arranged in the rotational shaft along the axial direction thereof while the outer surface of the coil spring is in contact with the inner circumferential surface of the rotational shaft, and having one end anchored to the first member and a free end situated on the second member side, the coil spring being adapted to expand in its radial direction to restrain the rotational shaft from rotating, when the second member is pivoted in the direction opposite the coiling direction, and adapted to contract in its radial direction to allow the rotational shaft to rotate, when the second member is pivoted in the coiling direction.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 to 5 show a laptop personal computer with a shaft lock device according to a first embodiment of the present invention, in which:

FIG. 1 is a perspective view of the computer with its display unit closed;

FIG. 2 is a perspective view of the computer with the display unit open;

FIG. 3 is an exploded perspective view of the computer with its inner cover and a flat panel display of the display unit off;

FIG. 4 is an exploded perspective view of the shaft lock device; and

FIG. 5 is a longitudinal sectional view of the shaft lock device;

DETAILED DESCRIPTION OF THE PREFERRED EMBODIMENTS

Figure 4:
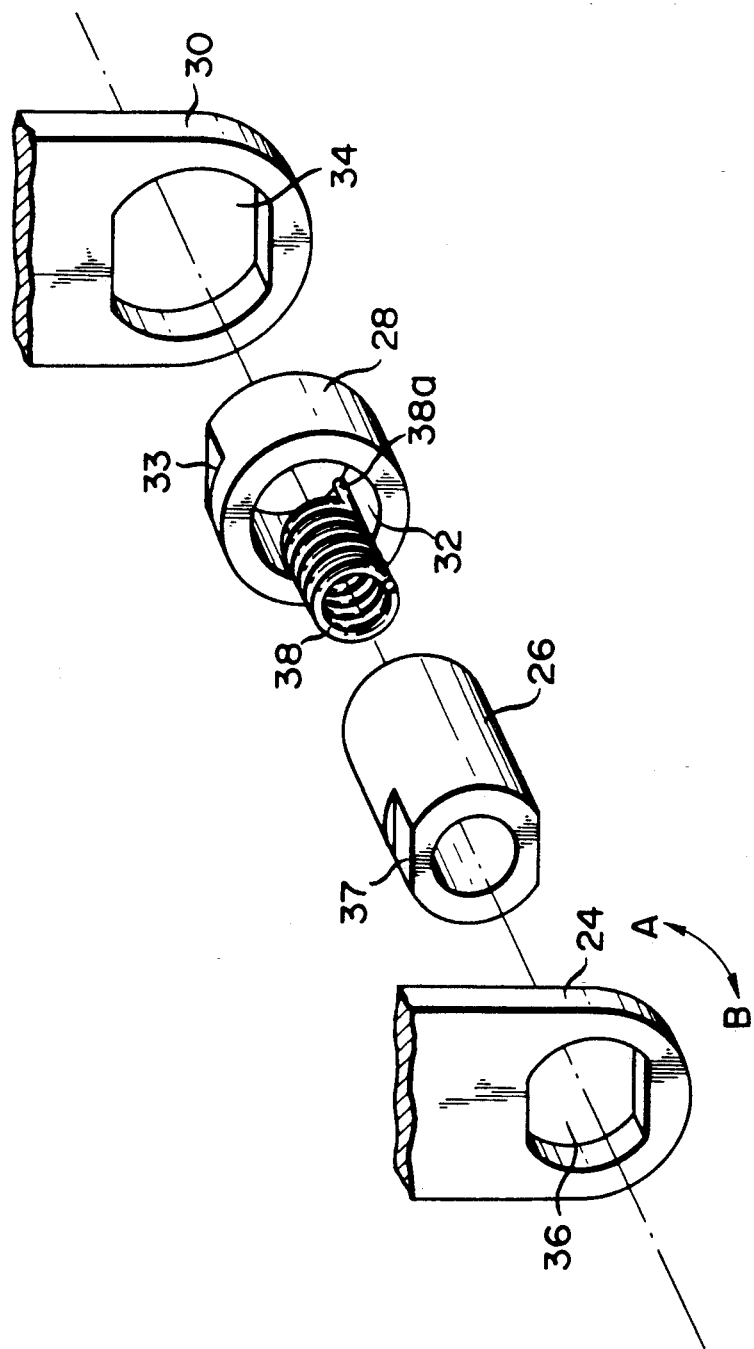

The preferred embodiments of the present invention will now be described in detail, with reference to the accompanying drawings.

FIGS. 1 to 3 show a laptop personal computer 10 which is provided with a shaft lock device according to a first embodiment of the present invention. Computer 10 comprises main body 12 and display unit 15 which is pivotably supported on the main body by means of a pair of shaft lock devices 22 (mentioned later). Main body 12 is provided with keyboard 13, floppy disk drive 14, etc. Display unit 15 includes flat-panel display 16, outer cover 15a covering the back side of display 16, and inner cover 15b having a display window. Unit 15 further includes a pair of legs 20. On the central portion of the upper surface of main body 12 is mounted cable duct 19 through which cables extend from main body 12 to display unit 15. Duct 19 is rotatably supported by legs 20.

Display unit 15 and main body 12 are provided with latch 17 and notch 18, respectively, which cooperate with each other. When unit 15 is pivoted to the closed position shown in FIG. 1, in which it covers keyboard 13, latch 17 engages notch 18, thereby locking unit 15 in the closed position. An operator can disengage latch 17 from notch 18 by pressing the latch. Thus, the operator can pivot display unit 15 between the closed position and an open position, in which keyboard 13 is ready for operation, while observing display 16.

Computer 10 is provided with shaft lock devices 22 which are used to hold display unit 15 at a desired angle in the open position. As shown in FIG. 3, each shaft lock device 22 includes bracket 24 for use as a second member. Brackets 24 are fixed to their corresponding legs 20 of display unit 15 by screws 24a and situated on either side of duct 19.

Figure 5:
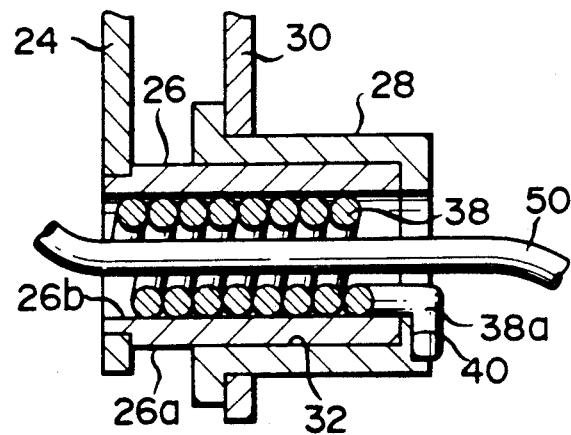

As shown in FIGS. 3 to 5, each shaft lock device 22 includes cylindrical rotational shaft 26, which has inner and outer circumferential surfaces 26b and 26a, coaxial with each other. The right-hand end portion of shaft 26 is rotatably supported by cylindrical support member 28 for use as a first member, which is fixed to its corresponding bracket 30 of main body 12. Support hole 32, which has an inner diameter substantially equal to the outer diameter of shaft 26, is formed in support member 28. The right-hand end portion of support member 28 is formed as retaining portion 33, which has an oblate cross section. The retaining portion is fitted in oblate retaining hole 34 of the corresponding bracket 30. Thus, support member 28 is unrotatably fixed to main body 12 through bracket 30, and the right-hand end portion of rotational shaft 26 is rotatably fitted in support hole 32 of its corresponding support member 28. In this manner, shaft 26 is supported to be rotatable around its central axis by member 28.

The left-hand end portion of shaft 26 is formed as retaining portion 37, which has an oblate cross section. Retaining portion 37 is fitted in oblate engaging hole 36 formed in its corresponding bracket 24. Thus, shaft 26 is coupled with bracket 24 and prevented from rotating relative to bracket 24. Accordingly, when display unit 15 is opened or closed, shaft 26 is rotated around its central axis together with display unit 15.

Coil spring 38 is coaxially arranged inside shaft 26. It is coiled so that its coil diameter is a little greater than the inner diameter of shaft 26. Thus, spring 38 is inserted in shaft 26 while being contracted in its radial direction, so that the outer surface of the spring is always pressed against inner circumferential surface 26b of shaft 26 by its own restoring force. Right-hand end 38a of spring 38 is fitted in engaging groove 40, formed on the right end of support member 28, while the left-hand end of the spring is free. Spring 38 is coiled in the direction of arrow B in FIG. 4, which is coincident with the closing direction (direction of arrow B in FIG. 2) of display unit 15.

Cable 50 for electrically connecting main body 12 with display unit 15 extends through rotational shaft 26.

The following is a description of the operation of computer 10 constructed in this manner, especially of shaft lock devices 22.

In starting the operation of computer 10, latch 17 is first unfastened, and display unit 15 is then pivoted in the direction of arrow A in FIG. 2 from the closed position shown in FIG. 1, by means of a certain pivoting force. Thereupon, rotational shafts 26 of shaft lock devices 22 rotate together with unit 15, also in the direction of arrow A. Coil spring 38 is contractedly squeezed in shaft 26, while its one end 38a is fixed to support member 28. Thus, frictional force is produced between inner circumferential surface 26b of shaft 26 and the outer surface of spring 38 by the expansive force of the spring. As shaft 26 rotates, therefore, spring 38 also rotates in the direction of arrow A in FIG. 4. Since rotating direction A is opposite to the coiling direction B of spring 38, the spring tends to expand in the radial direction, and is pressed against inner circumferential surface 26b of shaft 26 with ever greater force. Accordingly, the rotation of shaft 26 is stopped by the frictional force between spring 38 and the shaft, so that display unit 15 is locked in the position to which it is pivoted.

If the pivoting force in the direction of arrow A is increased, in this state, it resists the expansive force of spring 38 and the frictional force between the spring and shaft 26, so that the shaft rotates sliding on the outer surface of the spring. Thus, slip is caused between spring 38 and shaft 26. If display unit 15, further pivoted to a desired angular position, is released from the pivoting force, shaft 26 and device 15 are again locked in the desired position by the frictional force between shaft 26 and spring 38.

In this manner, display unit 15 can be easily locked in any desired angular position. If an excessive pivoting force is applied to unit 15, however, spring 38 slips, so that shaft 26 is unlocked. Accordingly, bracket 24 and shaft 26 can be prevented from being broken or bent, and spring 38 can be protected against snapping. The pivoting force to cause the slip of spring 38 may be adjusted to a desired value by changing the number of turns and coil diameter of spring 38.

If display unit 15 is to be pivoted in the direction of arrow B, from the aforesaid pivoted position to the closed position, coil spring 38 rotates together with shaft 26, also in the direction of arrow B. Since this rotating direction is coincident with the coiling direction B of spring 38, the coil diameter of the spring 38 is reduced, so that the force of the contact pressure between the spring and inner circumferential surface 26b of shaft 26 is reduced. Thus, display unit 15 can be returned to the closed position with relatively little pivoting force.

According to the shaft lock device constructed in this manner, display unit 15 can be securely locked to any desired angular position by utilizing the increase or decrease of the coil diameter of coil spring 38. Also, unit 15 can be easily returned to the closed position without using any special unlocking mechanism. Thus, the operating efficiency of the computer is greatly improved. At the same time, since coil spring 38 is housed in rotational shaft 26, a compact shaft lock device can be realized. Specifically, the distance between brackets 24 and 30 supporting rotational shaft 26 can be shorter than the axial length of coil spring 38, thereby reducing the axial length of shaft lock device 22.

Figure 6:
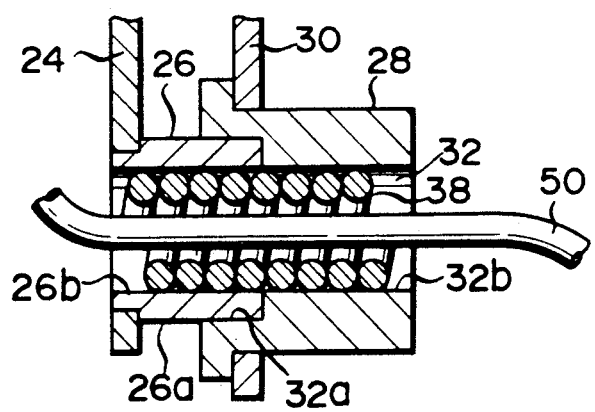
FIG. 6 is a longitudinal sectional view of a shaft lock device according to a second embodiment of the invention.

FIG. 6 shows a shaft lock device according to a second embodiment of the present invention. Like reference numerals refer to like portions throughout the drawings.

According to this second embodiment, support hole 32 of support member 28 is stepped. More specifically, hole 32 has large-diameter portion 32a on the left-end side and small-diameter portion 32b on the right-end side. The diameter of portion 32a is substantially equal to the outer diameter of rotational shaft 26, while that of portion 32b is substantially equal to the inner diameter of the shaft. The right-hand end portion of shaft 26 is rotatably fitted in large-diameter portion 32a. The left- and right-hand end portions of coil spring 38 are located inside shaft 26 and small-diameter portion 32b, respectively. The coil diameter of spring 38 is a little greater than the inner diameter of shaft 26 and the diameter of portion 32b. Thus, spring 38 is always pressed against the respective inner circumferential surfaces of shaft 26 and small-diameter portion 32b. Both ends of spring 38 are free ends, and the spring is fixedly retained by support member 28, by pressing its right-hand end portion against the inner circumferential surface of small-diameter portion 32b.

Constructed in this manner, the second embodiment can provide the same advantages as the first embodiment. Support member 28 may be formed of relatively soft material, such as plastic. In this case, the friction between spring 38 and the inner circumferential surface of small-diameter portion 32b is lowered. Since both ends of spring 38 are free ends, moreover, spring 38 can slip by means of a smaller pivoting force than in the first embodiment. Thus, display unit 15 can be opened or closed with a relatively small pivoting force, so that the operating efficiency of computer 10 is further improved.

Figure 7:
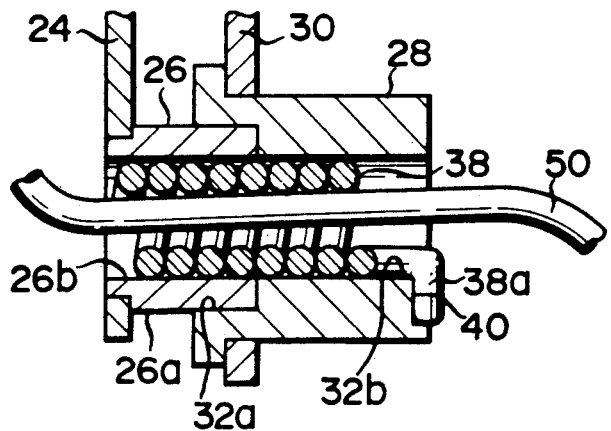
FIG. 7 is a longitudinal sectional view of a shaft lock device according to a third embodiment of the invention.

In the third embodiment, right-hand end 38a of coil spring 38 may be fixedly fitted in engaging groove 40 bored through support member 28, as shown in FIG. 7.

Additional advantages and modifications will readily occur to those skilled in the art. Therefore, the invention in its broader aspects is not limited to the specific details, representative devices, and illustrated examples shown and described. Accordingly, departures may be made from such details without departing from the spirit or scope of the general inventive concept as defined by the appended claims and their equivalents.

What is claimed is:

1. A shaft lock device comprising:
   a cylindrical rotational shaft having inner and outer circumferential surfaces;
   a first member supporting one end portion of the rotational shaft so that the shaft is rotatable around an axis thereof;
   a second member fixed to another end portion of the rotational shaft and rotatable integrally with the rotational shaft; and
   a coil spring coil in a predetermined direction and having a coil diameter greater than an inner diameter of the rotational shaft, said coil spring being arranged in the rotational shaft along an axial direction thereof while an outer surface of the coil spring is pressed against the inner circumferential surface, and having one end anchored to the first member and a free end situated on the second member side, said coil spring being adapted to expand in a radial direction to restrain the rotational shaft from rotating when the second member is rotated in a direction opposite the coiling direction and the coil spring is rotated in the same direction by means of friction between the coil spring and the rotational shaft, and adapted to contract in the radial direction to allow the rotational shaft to rotate when the second member is rotated in the coiling direction and the coil spring is rotated in the same direction by means of friction between the coil spring and the rotational shaft.

2. A device according to claim 1, wherein a number of turns and the coil diameter of said coil spring are set so that the coil spring slips on the inner circumferential surface of the rotational shaft when the second member is rotated in the direction opposite the coiling direction with a rotating force of a value not smaller than a predetermined value 3. A device according to claim 1, wherein said first member has a support hole having an inner diameter substantially equal to an outer diameter of the rotational shaft, one end portion of said rotational shaft being rotatably fitted in said support hole.

4. A device according to claim 3, wherein said first member has a retaining portion, one end of said coil spring being fixedly inserted in the retaining portion.

5. A device according to claim 1, wherein said first member has a stepped support hole, including a large-diameter portion having a diameter substantially equal to an outer diameter of the rotational shaft and a small-diameter portion having a diameter substantially equal to the inner diameter of the rotational shaft, one end portion of said rotational shaft being rotatably fitted in the large-diameter portion, and said coil spring having one end portion fitted in the rotational shaft and another end portion fitted in the small-diameter portion.

6. A device according to claim 5, wherein said first member has a retaining portion, one end of said coil spring being fixedly inserted in the retaining portion.

7. An electronic apparatus comprising:
   a main body including input means for inputting information;
   a display device including display means for displaying information; and
   shaft lock means for supporting the display device on the main body so that the display device is rotatable between a closed position and an open position, and for locking the display device at a desired angular position,
   said shaft lock means including:
   a cylindrical rotational shaft having inner and outer circumferential surfaces, said rotational shaft having one end portion fixed to the display device and another end portion rotatably supported on the main body so that the shaft is rotatable integrally with the display device around an axis of the shaft, and
   a coil spring coiled in a predetermined direction and having a coil diameter greater than an inner diameter of the rotational shaft, said coil spring being arranged in the rotational shaft along an axial direction thereof while an outer surface of the coil spring is pressed against the inner circumferential surface, and adapted to expand in a radial direction to restrain the rotational shaft from rotating when the display device is rotated in a direction opposite the coiling direction and the coil spring is rotated in the same direction by means of friction between the coil spring and the rotational shaft, and adapted to contract in the radial direction to allow the rotational shaft to rotate when the display device is rotated in the coiling direction and the coil spring is rotated in the same direction by means of friction between the coil spring and the rotational shaft.

8. An electronic apparatus according to claim 7, wherein the coiling direction of said coil spring is coincident with a direction of the rotation of the display device from the closed position to the open position.

9. An electronic apparatus according to claim 7, wherein a number of turns and the coil diameter of said coil spring are set so that the coil spring slips on the inner circumferential surface of the rotational shaft when the display device is rotated in the direction opposite the coiling direction with a rotating force of a value not smaller than a predetermined value.

10. An electronic apparatus according to claim 7, wherein said coil spring has one end anchored to the main body, and one free end.

11. A shaft lock device comprising:
a cylindrical rotational shaft having inner and outer circumferential surfaces;
a first member supporting the rotational shaft so that the shaft is rotatable around an axis thereof, the first member having a support hole with an inner diameter substantially equal to an outer diameter of the rotational shaft, one end portion of the rotational shaft being rotatably fitted in the support hole;
a second member fixed to another end portion of the rotational shaft and rotatable integrally with the rotational shaft; and
a coil spring coil in a predetermined direction and having a coil diameter greater than an inner diameter of the rotational shaft, said coil spring being arranged in the rotational shaft along an axial direction thereof while an outer surface of the coil spring is pressed against the inner circumferential surface of the rotational shaft, and having one end anchored to the first member and a free end situated on the second member side, said coil spring being adapted to expand in a radial direction to restrain the rotational shaft from rotating when the second member is rotated in a direction opposite the coiling direction, and adapted to contract in the radial direction to allow the rotational shaft to rotate when the second member is rotated in the coiling direction.

12. A shaft lock device comprising:
a cylindrical rotational shaft having inner and outer circumferential surfaces;
a first member supporting the rotational shaft so that shaft is rotatable around an axis thereof, the first member having a stepped support hole, including a large-diameter portion having a diameter substantially equal to an outer diameter of the rotational shaft and a small-diameter portion having a diameter substantially equal to an inner diameter of the rotational shaft, one end portion of said rotational shaft being rotatably fitted in the large-diameter portion;
a second member fixed to another end portion of the rotational shaft and rotatable integrally with the rotational shaft; and
a coil spring coil in a predetermined direction and having a coil diameter greater than an inner diameter of the rotational shaft, said coil spring including one end portion fitted in the small-diameter portion, and another end portion fitted in the rotational shaft in an axial direction thereof while an outer surface of the coil spring is pressed against an inner circumferential surface of the small-diameter portion and the inner circumferential surface of the rotational shaft, said coil spring being adapted to expand in a radial direction to restrain the rotational shaft from rotating when the second member is rotated in a direction opposite the coiling direction, and adapted to contract in the radial direction to allow the rotational shaft to rotate when the second member is rotated in the coiling direction.

13. A shaft lock device comprising:
a rotational shaft including an axial direction, a shaft outer surface having a fixing portion and a supported portion having a first outer diameter and a shaft inner surface defining a coil storing portion extending in the axial direction and having a first contact portion, the coil storing portion having a first inner diameter;
a supporting member including a first stopper portion and a shaft storing portion defining a shaft storing hole having a second inner diameter substantially equal to the first outer diameter for rotatably supporting the supported portion;
a fixing member attached to the fixing portion for rotating integrally with the rotational shaft; and
a coil spring coiled in a predetermined coiling direction and including a coil outer surface having a second contact portion, a second stopper portion and a relaxed second outer diameter greater than the first inner diameter, the coil spring being arranged in the coil storing portion in the axial direction so that the second contact portion pushes the first contact portion and the first stopper portion restrains a rotation of the second stopper portion, the coil spring generating a force for restraining a rotation of the fixing member when the fixing member is rotated in a direction opposite to the coiling direction and allowing a rotation of the fixing member when the fixing member is rotated in the coiling direction.

14. A shaft lock device according to claim 13, wherein the second stopper portion comprises an anchored portion and the first stopper portion comprises a retaining portion for retaining the anchored portion.

15. A shaft lock device according to claim 13, wherein the rotational shaft includes a bore extending in the axial direction and including the coil storing portion.

16. A shaft lock device according to claim 15, wherein the shaft supporting portion includes a bore extending in the axial direction and including the shaft storing hole.

17. A shaft lock device according to claim 16, wherein the fixing member includes a fixing hole for attached to the fixing portion.

18. A shaft lock device according to claim 17, wherein the fixing portion includes a bore extending in the axial direction and including the fixing hole.

19. A shaft lock device according to claim 13, wherein the supporting member includes a coil storing portion defining a coil storing hole being continuous with the shaft storing hole, the coil storing hole having a third inner diameter smaller than the second outer diameter.

20. A shaft lock device according to claim 19, wherein the third inner diameter equals the first inner diameter.

21. A portable computer comprising:
a base unit having a keyboard;
a display unit having a display screen; and a shaft device rotatably connecting the base unit and the display unit, the shaft device including;

a rotational shaft having an axial direction, a shaft outer surface having a fixing portion and a supported portion having a first outer diameter and a shaft inner surface defining a coil storing portion extending in the axial direction and having a first contact portion, the coil storing portion having a first inner diameter, a supporting member including a first stopper portion and a shaft storing portion defining a shaft storing hole having a second inner diameter substantially equal to the first outer diameter for rotatably supporting the supported portion, a first fixing member for fixing the supporting member to the base unit, a second fixing member for fixing the fixing portion to the display unit so that the rotational shaft is rotated integrally with the display unit, and a coil spring coiled in a predetermined coiling direction and including a coil outer surface having a second contact portion, a second stopper portion and a relaxed second outer diameter greater than the first inner diameter, the coil spring being arranged in the coil storing portion in the axial direction so that the second contact portion pushes the first contact portion and the first stopper portion restrains a rotation of the second stopper portion, the coil spring generating a force for restraining a rotation of the display unit when the display unit is rotated in a direction opposite to the coiling direction and allowing a rotation of the display unit when the display unit is rotated in the coiling direction.

22. A portable computer according to claim 21, wherein the display unit is rotated between a closed position for covering the keyboard and an open position for exposing the display screen.

23. A portable computer according to claim 22, wherein the rotation of the display unit from the closed position to the open position corresponds to the rotation in the direction opposite to the coiling direction.

24. A portable computer according to claim 21, which further comprises a cable for electrically connecting the display unit and the base unit.

25. A portable computer according to claim 24, wherein the shaft device includes a path for the cable.

26. A shaft lock device comprising:

a rotational shaft including an axial direction, a fixing portion, a supported portion having a first diameter and a shaft inner surface defining a coil storing portion extending in the axial direction and having a first contact portion, the coil storing portion having a second diameter;

a supporting member including a first stopper portion and a shaft storing portion defining a shaft storing hole having a third diameter substantially equal to the first diameter for rotatably supporting the supported portion;

a fixing member attached to the fixing portion for rotating integrally with the rotational shaft; and a coil spring coiled in a predetermined coiling direction and including a coil outer surface having a second contact portion, a second stopper portion and a relaxed fourth diameter greater than the second diameter, the coil spring being arranged in the coil storing portion in the axial direction so that the second contact portion pushes the first contact portion and the first stopper portion restrains a rotation of the second stopper portion, the coil spring generating a force for restraining a rotation of the fixing member when the fixing member is rotated in a direction opposite to the coiling direction and allowing a rotation of the fixing member when the fixing member is rotated in the coiling direction.

* * * * *